June 21, 1955

C. E. ADAMS 2,711,077

STEERING CONTROL MECHANISM FOR CRAWLER TRACTORS

Filed June 8, 1954

INVENTOR.
CECIL E. ADAMS
BY
*Herschel C. Omohundro*
*attorney*

INVENTOR.
CECIL E. ADAMS

June 21, 1955 C. E. ADAMS 2,711,077
STEERING CONTROL MECHANISM FOR CRAWLER TRACTORS
Filed June 8, 1954 3 Sheets-Sheet 3

INVENTOR.
CECIL E. ADAMS
BY
Herschel C. Imohundro
attorney

United States Patent Office 2,711,077
Patented June 21, 1955

2,711,077

STEERING CONTROL MECHANISM FOR CRAWLER TRACTORS

Cecil E. Adams, Columbus, Ohio, assignor to The Denison Engineering Company, Columbus, Ohio, a corporation of Ohio Application June 8, 1954, Serial No. 435,323

4 Claims. (Cl. 60—97)

This invention relates generally to vehicles and more particularly to tractors, tanks and similar machines of the crawler or track-laying type. Still more specifically, the invention relates to machines of such types in which the mechanism for operating or driving the tracks is hydraulically powered and has a separate fluid motor for each track, the invention being directed to a combined speed and steering control apparatus for machines of the character specified.

In crawler type vehicles, steering is sometimes accomplished by driving the tracks at the opposite sides of the vehicles at different rates of speed. Due to this differential, one track covers more ground and thus causes the vehicle to turn. Heretofore complicated mechanisms have been provided to cause the tracks to be driven at different rates of speed and consequently considerable skill and dexterity on the part of the operator were required to drive the vehicles.

An object of this invention is to provide a hydraulic mechanism by which the steering and speed controlling operations of such vehicles will be materially simplified and yet more positive.

Another object of this invention is to provide a hydraulic driving mechanism for the tracks of a crawler type vehicle, such driving mechanism having a single control member for the speed of the vehicle and a separate single control for the steering of the vehicle, such control members being arranged in the hydraulic driving system and yet each being unaffected by the operation of the other.

A further object of this invention is to provide a hydraulic driving mechanism for the tracks of a crawler type vehicle, such driving mechanism having a separate fluid driven motor for each track, a single control mechanism for simultaneously and proportionally varying the rate of operation of such motors to effect the steering of the vehicle and another independently operable control mechanism for varying the volume of pressure fluid supplied to the driving motors to change the speed of the vehicle, the steering control operating as usual regardless of the change in volume of fluid supplied to the driving motors.

A still further object of the invention is to provide a combination speed and steering control mechanism of the type specified in the preceding paragraph with reversing valves for the fluid motors by which the vehicle may be caused to move forward or backward at will and, in necessary instances, to turn sharply to the right or left or completely around.

Another object of the invention is to provide a combination speed and steering control mechanism for a hydraulically driven crawler type vehicle, such mechanism having a means for varying the volume of fluid supplied to the track driving motors and a second means between the first means and the motors for proportionally dividing the volume of fluid supplied to the motors to control their relative rates of operation, the second means being adjustable so that different ratios of volumes may be supplied to the motors and consequently the relative rates of operation varied, such changes serving, as pointed out above, to effect the steering of the vehicle.

Still another object of the invention is to provide a mechanism of the type indicated in the preceding paragraph, the second means thereof having a steering control casing with a single inlet and a pair of outlets, one outlet being connected with one motor and the other outlet with the other motor, the control casing housing a movable valve element selectively operated to vary the ratios of fluid volumes directed to the outlets and thence to the motors and also responsive to fluid pressure changes in the inlet to move to maintain selected ratios when the volume of fluid supplied to the steering control varies, the control casing also housing a second valve element of the metering type which is responsive to pressure differentials in the passages leading from the single inlet to the fluid motors to control flow through the passages thereby maintaining pressures required in certain parts of the passages to insure the proper operation of the first valve element.

Further objects and advantages of the present invention will be apparent from the following description, reference being had to the accompanying drawings wherein a preferred form of embodiment of the invention is clearly shown.

Figure 1:
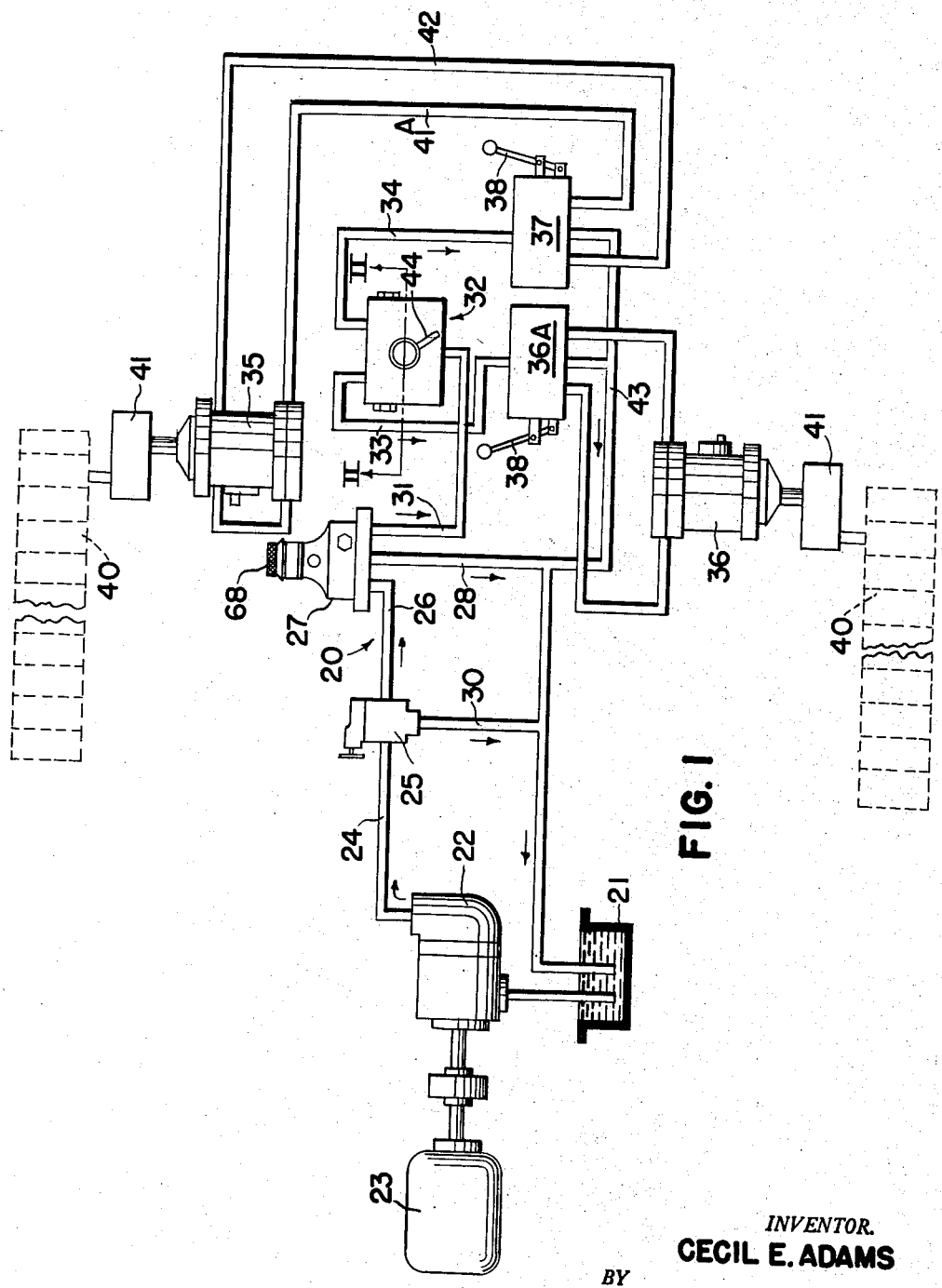
Fig. 1 is a diagrammatic view of the hydraulic system used in the driving operation of a crawler type tractor, this hydraulic system including a combined speed and steering control mechanism formed in accordance with the present invention.

Referring more particularly to the drawings and especially to Fig. 1, the hydraulic system used to operate the driving motors and steering apparatus of the tractor is indicated generally by the numeral 20. This hydraulic system includes a reservoir 21, a pump 22 which is driven by a suitable prime mover 23 and serves to draw fluid from the reservoir 21 and force it through a conduit 24 to the tractor driving mechanism. The line 24 contains a relief valve 25 which may be of any suitable construction and operates to bypass excess fluid delivered by the pump, back to the reservoir when pressure for which the valve has previously been set is reached in the system. From the valve 25, a fluid conductor 26 leads to a speed control valve 27 which may also be of any suitable type, the flow control valve disclosed in the co-pending application of Cecil E. Adams and John Franklyn Hedge, Serial No. 409,722, filed February 11, 1954, being suitable.

This valve is adjustable and operates to permit predetermined volumes of fluid delivered by the pump 22 to flow to the operating mechanism, excess fluid being returned through line 28 to the reservoir 21. This line 28 also has a branch 30 leading from the relief valve 25 to conduct fluid bypassed by this valve to the reservoir. Line 31 extends from the speed control valve 27 to the inlet of the steering control mechanism indicated generally by the numeral 32. This valve is shown in detail in Figs. 2 to 6, inclusive, and the construction will be fully described in detail hereinafter. In general, its operation is as follows: The control mechanism 32 serves to direct selected portions of the volume of fluid supplied through line 31, through lines 33 and 34, the former line serving driving motor 35 on one side of the tractor while line 34 serves the driving motor 36 on the other side of the tractor. Lines 33 and 34 contain reversing valves 36A and 37, respectively, for controlling forward and reverse movement of the tractor. These reversing valves may also be of any suitable type and are shown with individual operating levers 38 so that the valves may be selectively operated in the event it should be desired to reverse one driving motor while the other is operating in a forward direction.

The driving motors 35 and 36 effect the operation of endless tracks, indicated generally by the numeral 40, the power delivered by the motors 35 and 36 passing through reduction gearing 41 arranged between the driving motors and the tracks 40. A pair of lines 41A and 42 lead from each reversing valve to the respective motor controlled thereby, fluid flowing in either direction through these lines depending on the direction of operation of the fluid motors. When one line is operating as an inlet, the other line conducts fluid from the motor back to the valve to be returned through lines 43 and 28 to the reservoir 21.

As pointed out previously, steering of the tractor is accomplished by rotating the motors 35 and 36 at different rates. This operation is secured through the adjustment of a knob or handle 44 on the steering control mechanism 32. The adjustment of handle 44 changes the ratio of volumes of fluid directed through lines 33 and 34. The lever has an intermediate position in which the volume of fluid supplied to the control 32 is divided equally causing motors 35 and 36 to operate at the same rate. When so operating, the tractor will move in a straight line. When the lever 44 is moved to either side of the intermediate position, the volume supplied to one or the other motor will be increased and the volume supplied to the remaining motor will be decreased. The direction of movement of the handle 44 will determine which of the fluid lines 33 and 34 receive the larger volume and vice versa and consequently the direction of movement of the tractor.

The construction of the steering control 32 has been shown in detail in Figs. 2 to 6. This steering mechanism includes a casing 45 having a vertical bore 46 extending therethrough from top to bottom and a horizontal bore 47 extending from one side of the casing to the other. Cored passages 50 and 51 extend from opposite sides of the vertical bore 46 to the ends of the horizontal bore 47. Vertical bore 46 has a sleeve 48 secured therein, this sleeve being non-rotatable and having slots 52 and 53 formed in the side wall, slot 52 registering with passage 50 and slot 53 registering with passage 51. Slots 52 and 53 are rectangular in shape, the purpose of which will be apparent from the following description.

Figure 2:
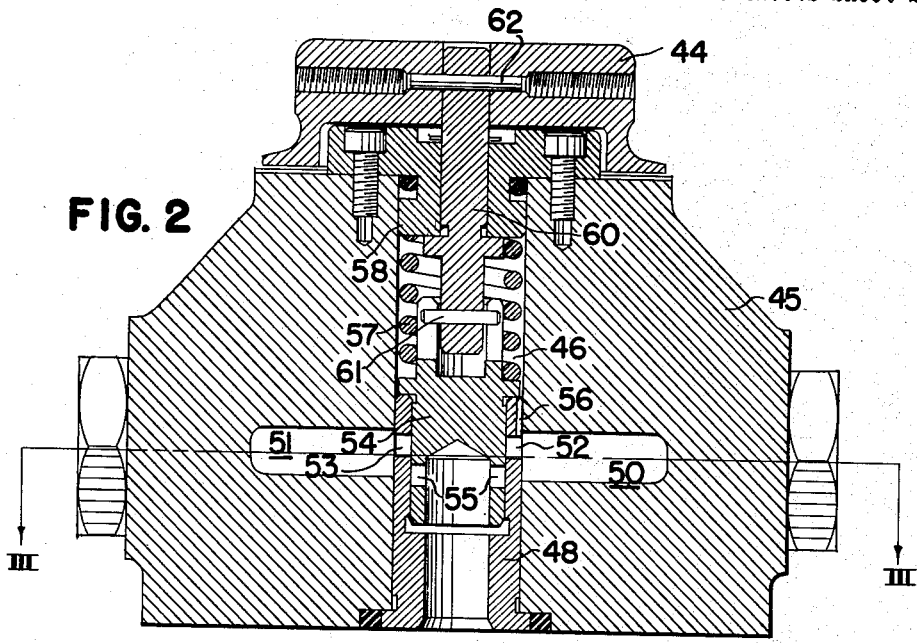
Fig. 2 is a vertical sectional view taken through the steering control mechanism, the plane of the section being indicated by the line II—II of Fig. 1.
Figure 3:
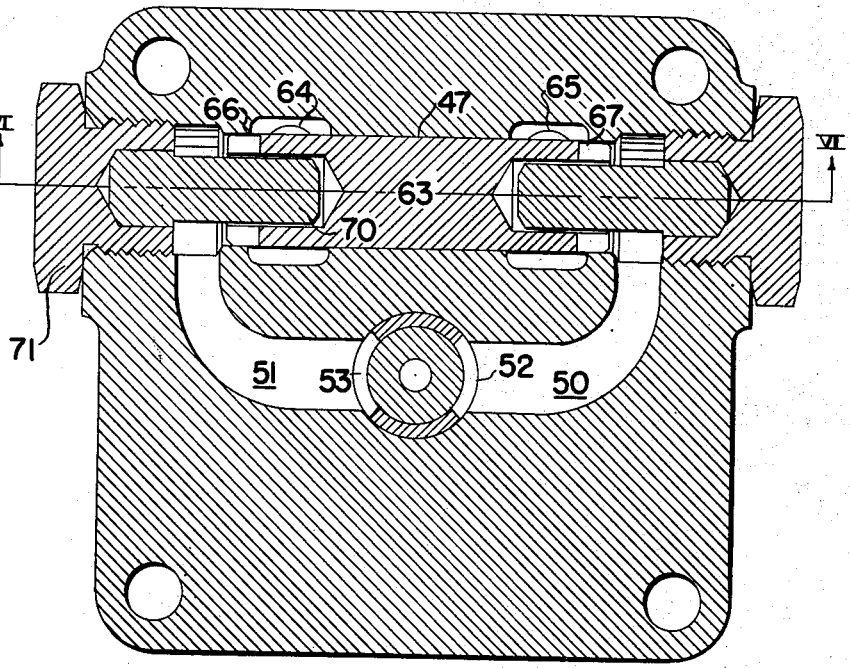
Fig. 3 is a horizontal sectional view taken through the steering control mechanism on the plane indicated by the line III—III of Fig. 2.
Figure 4:
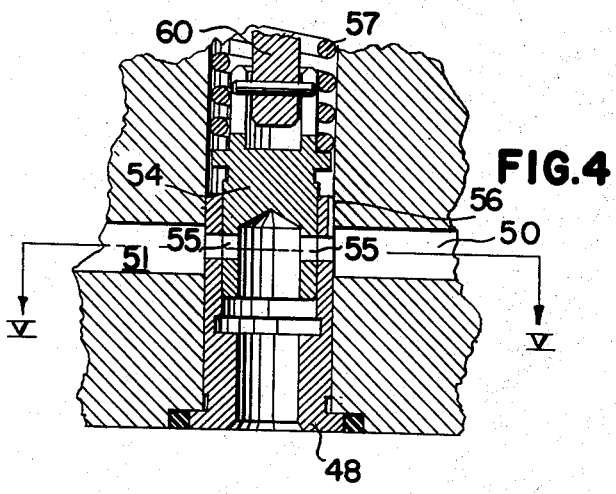
Fig. 4 is a fragmentary vertical sectional view taken through the steering control mechanism on the same plane as Fig. 2 is taken but showing a portion of the mechanism in a different position.
Figure 5:
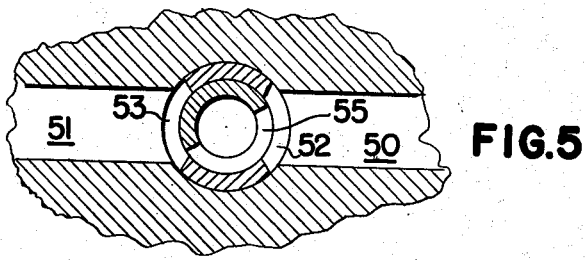
Fig. 5 is a horizontal sectional view taken on the plane indicated by line V—V of Fig. 4
Figure 6:
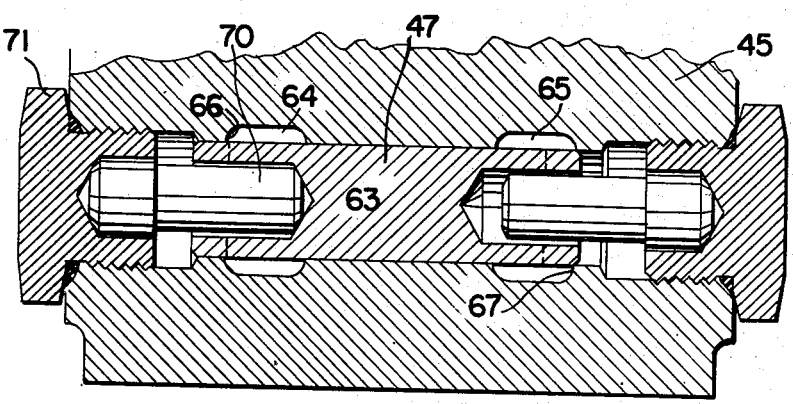
Fig. 6 is a fragmentary horizontal sectional view taken through the steering control mechanism showing some of the parts shown in Fig. 3 in different positions, the section being taken on the plane indicated by line VI—VI of Fig. 3.

Sleeve 48 slidably receives a valve element 54, the lower end of which has an internal bore for receiving fluid admitted through the hollow interior of the sleeve 48. When the casing 45 is mounted, it is secured to a subplate to which fluid lines 31, 33 and 34 are connected. The casing is so disposed that the open lower end of the sleeve 48 will communicate with line 31 and constitute an inlet to the steering control. This inlet is connected with the branches formed by passages 50 and 51 through a slot 55 cut through one side of the valve element 54. This valve element is both slidable and rotatable in the sleeve 48. The central opening in the lower end of the element 54 terminates a short distance above the slot 55 so that all the fluid flowing into this central opening will be directed through the slot 55 to the passage branches 50 and 51. As shown in Fig. 2, one side of the sleeve 48 has a slot 56 formed therein to conduct fluid from the branch 50 registering therewith to the bore 46 above the valve element 54. This valve element is urged in a downward direction by a coil spring 57 disposed in engagement with an annular shoulder formed on the valve element and the under side of a plug employed to close the open upper end of the bore 46. This plug 58 has a central opening for the rotatable movement of a stem 60, the lower end of which projects into a recess formed in the upper end of the valve element 54.

Stem 60 is provided with a cross pin 61, the ends of which project into slots formed in the upper portion of the valve element 54 so that rotary movement of the stem 60 will be transmitted to the valve element yet permit this element to slide longitudinally in the sleeve 48. The upper end of stem 60 is pinned, as at 62, to the control handle 44. This member may be a lever or a knob depending on the desires of the manufacturer. It will be obvious that rotary movement of the member 44 will be transmitted to the valve element 54 to vary the position of the slot 55 relative to the slots or openings 52 and 53. It should be obvious that, in one position of the valve element 54, equal areas of the slots 52 and 53 will register with the slot 55. This position of the control 44 has been designated above as the intermediate position.

When in this position, the volume of fluid supplied to the control mechanism will be divided equally, half flowing through passage 50 and the other part to passage 51. As shown in Fig. 2, valve element 54 may move under the influence of the spring 57 to a position wherein slot 55 is completely out of register with slots 52 and 53. The valve element will be in this condition when no fluid is being directed to the steering control mechanism. When fluid under pressure is supplied thereto, however, the force of this fluid on the under side of the valve element will move it in an upward direction in opposition to the spring 57 until the slot 55 starts to register with the slots 52 and 53 at which time the incoming fluid will be divided. The ratio of fluid directed through the branch passages will be determined by the rotary position of the handle 44.

It will be obvious that, when the slots register, a pair of orifices will be provided between the inlet and the branch passages, one orifice being at the entrance of each branch passage. The fluid pressure at the outlet side of one of the orifices will be conducted through slot 56 to the upper end of the bore 46 and be applied to the upper end of the valve element 54. This fluid will tend to assist spring 57 to move the valve element 54 to a closed position. This valve element will, therefore, be responsive to the differential in pressures between the inlet and outlet sides of the orifices. To insure the division of incoming fluid into the ratios for which the valve element 54 has been adjusted irrespective of the volume of fluid supplied to the steering control mechanism, use is made of a flow metering spool 63 which is disposed for movement in the bore 47 formed in the casing 45.

The spool 63 is exposed at its ends to the fluid pressure existing in branch passages 50 and 51 and in the ends of the bore 47 with which these branch passages communicate. The casing 45 is provided with outlets 64 and 65, the former communicating with line 33 and the latter with line 34. These outlets connect with the bore 47 at points spaced a short distance from the ends of the bore which are connected with the branch passages. The spacing between the ends of the bore 47 and the outlet ports 64 and 65 provide shoulders 66 and 67 with which the spool 63 cooperates to meter the flow of fluid from the branch passages into the outlet port. In this instance, the spool 63 has sockets formed in its ends and is provided with slots extending outwardly from the sockets to provide metering orifices. These slots cooperate with the shoulders 66 and 67 to form rectangular metering orifices which vary in size as the spool moves longitudinally of the bore 47, the orifices at one end of the device increasing as the orifices at the other end decrease.

In the operation of the mechanism, resistance applied to one or the other of the fluid motors 35 and 36 will cause the pressure in the line through which fluid is being supplied thereto to increase. When this pressure increase occurs, it will be applied to the end of the spool 63 exposed to the pressure in that line causing the spool to move to resist fluid flow through the other line, that is, from the branch passage to the outlet port in the other line. The spool 63 will move until enough resistance is applied to cause the pressure in the second branch passage to equal the pressure in the other branch passage. The spool will then reach a point of equilibrium due to the equal pressures at opposite ends thereof. In this manner, the pressures in the branch passages and consequently the pressures at the outlet sides of the orifices formed by the valve element 54 and sleeve 48 will always be equal. Since a single inlet communicates with these orifices, pressure differences between the inlet sides of the orifices and the outlet sides thereof will be maintained the same regardless of the volume of fluid supplied to the inlet or the ratio of the division secured by the valve element 54. Any change in the volume of fluid supplied to the device will tend to cause the pressure differential to change but, since the valve element 54 is exposed at opposite ends to the pressure differential, it will move to compensate for the change in volume, the orifices either increasing or decreasing in size without changing the ratio of sizes of the orifices.

The valve assembly disposed in the bore 46 functions as a flow control mechanism, and in cooperation with the spool 63, insures the proper division of the incoming fluid to operate the motors 35 and 36 at the rates desired.

It will be evident from the foregoing that, when the control 44 is turned to change the ratio of fluids flowing through lines 33 and 34, the rates of operation of the motors 35 and 36 will correspondingly be changed and consequently the direction of movement of the tractor will also be changed. The speed at which the tractor moves may be changed by varying the volume of fluid supplied to the inlet of the control mechanism 44. This variation takes place through the adjustment of the control knob 68 provided at the top of the flow control device 27.

The degree of movement of the spool 63 is determined by stop pins 70 projecting from plugs 71 removably disposed in the ends of the bore 47. Pins 70 project into the openings in the ends of the spool 63, these openings being only slightly larger than the pins 70 so that the rate of fluid flowing from the openings past the pins will be reduced, the pins and openings therefor being in the nature of dashpots to prevent sudden movement of the spool. The danger of shock in the operation of the motors 35 and 36 is thus eliminated.

While the form of embodiment of the present invention as herein disclosed constitutes a preferred form, it is to be understood that other forms might be adopted, all coming within the scope of the claims which follow:

I claim:

1. A combined speed and steering control mechanism for a crawler type tractor having a separate fluid motor for each track comprising a source of fluid pressure; a variable flow control device connected with said pressure source to govern the volume of fluid supplied to said motors; a steering member casing having an inlet connected with said flow control and a pair of branch lines each of which leads to a different fluid motor; a valve element disposed at the juncture of said inlet and branch lines for controlled movement to provide orifices of proportionally variable sizes, said orifices directing fluid admitted through said inlet into said branches in ratios determined by the adjustment of said valve element, said valve element being movable in response to pressure differentials between the inlet and outlet sides of said orifices to maintain the selected ratio of fluid volumes directed through said branches irrespective of the volume of fluid admitted by said flow control; and a flow metering spool for controlling fluid flow through said branch lines, said spool having opposed portions exposed to the pressures in said branch lines and being movable in response to differentials in such pressures to restrict flow in the branch with the lower pressure to equalize the pressures in said branches.

2. Steering control mechanism for a crawler type tractor having a separate fluid motor for each track comprising a source of fluid pressure; a steering member casing having an inlet connected with said pressure source and a pair of outlets each of which communicates with a different fluid motor, said outlets being connected with said inlet by branch passages; a valve element disposed at the juncture of said inlet and branch passages, said valve element being formed to provide orifices in said branch passages; means for rotating said valve element to simultaneously and oppositely vary the sizes of said orifices to direct varying proportions of the fluid admitted through said inlet into said branch passages, said valve element being movable in response to a tendency of the pressure differential between the inlet and outlet sides of said orifices to change to maintain any selected ratio of fluid volumes directed through said branch passages irrespective of volume variations at said pressure source; and a metering spool for controlling fluid flow from said outlets, said spool having opposed portions exposed to the pressures between said orifices and said fluid motors and being movable in response to differentials in such pressures to restrict flow through one outlet.

3. Steering control mechanism for a crawler type tractor having a separate fluid motor for each track comprising a source of fluid pressure; a steering member casing having an inlet communicating with said pressure source and a pair of outlets; a pair of reversing valves each having the inlet thereof connected with a different outlet of said steering member, said reversing valves having forward and reverse ports connected with corresponding ports of said fluid motors; branch passages in said steering member casing extending from said inlet to said outlets; a valve element disposed in said casing and formed to provide an orifice in each branch passage; means for adjusting said valve element to simultaneously increase the size of either orifice and decrease the size of the other to direct varying proportions of the fluid admitted through said inlet into said branch passages; means yieldably tending to move said valve element to close said orifices without changing the size relation of one to the other, said element being movable in response to a tendency of the pressure differential between the inlet and outlet sides of said orifices to change to maintain any selected ratio of fluid flow through said branch passages irrespective of volume variations at said pressure source; and a metering spool for controlling fluid flow from said outlets, said spool having opposed portions exposed to the pressures between said orifices and said reversing valves and being movable in reponse to differentials in such pressures to restrict flow through one outlet.

4. A combined speed and steering control mechanism for a crawler type tractor having a separate fluid motor for each track comprising a source of fluid pressure; means for controlling the volume of fluid delivered by said pressure source; a steering member casing having an inlet communicating with said pressure source and a pair of outlets connected with said inlet by branch passages; a pair of reversing valves, each having an inlet communicating with a different outlet of said steering member casing and a pair of work ports communicating with the forward and reverse ports of said fluid motors; a valve element supported in said casing for both axial and rotary movement, said valve element being formed to provide an orifice in each branch passage, rotary movement of said element simultaneously increasing the size of one orifice and decreasing the size of the other to vary the volumetric ratios of fluid directed from said inlet into said branch passages; spring means tending to move said valve element axially to reduce the sizes of said orifices without changing the selected ratio, said element being axially movable in response to a tendency of the pressure differential between the inlet and outlet sides of said orifices to change to maintain any selected ratio of fluid flow through said branch passages irrespective of changes caused by adjustment of said volume control means; and a metering valve for controlling fluid flow from said outlets, said pressures between said orifices and said reversing valves and being movable in response to differentials in such metering valve having opposed portions exposed to the pressures to restrict flow through one outlet.

No references cited.